US00RE36174E

United States Patent [19]

Fabricius et al.

[11] E Patent Number: Re. 36,174

[45] Reissued Date of Patent: Mar. 30, 1999

[54] PHOTOGRAPHIC ELEMENT WITH NEAR-INFRARED ANTIHALATION LAYER

[75] Inventors: Dietrich M. Fabricius, Hendersonville, N.C.; Thomas Schelhorn, Neu Isenburg, Germany

[73] Assignee: Sterling Diagnostic Imaging, Inc., Brevard, N.C.

[21] Appl. No.: 847,094

[22] Filed: May 1, 1997

Related U.S. Patent Documents

Reissue of:

[64] Patent No.: 5,330,884
Issued: Jul. 19, 1994
Appl. No.: 72,852
Filed: May 26, 1993

[51] Int. Cl.[6] ..... G03C 1/83

[52] U.S. Cl. ..... 430/522; 430/510; 430/517

[58] Field of Search ..... 430/522, 510, 430/517; 548/455, 478, 142, 159, 221, 251, 263.2, 263.4, 264.8, 427, 465; 544/315, 248, 316, 318, 345

[56] References Cited

U.S. PATENT DOCUMENTS

| | | | |
|---|---|---|---|
| 3,460,947 | 8/1969 | Ficken | 96/84 |
| 3,482,978 | 12/1969 | Fumia et al. | 430/588 |
| 4,876,181 | 10/1989 | Proehl et al. | 430/522 |
| 4,882,265 | 11/1989 | Laganis et al. | 430/522 |
| 4,933,269 | 6/1990 | Parton et al. | 430/522 |
| 5,107,063 | 4/1992 | West et al. | 548/455 |
| 5,190,854 | 3/1993 | Goedeweeck | 430/576 |
| 5,440,042 | 8/1995 | Fabricius et al. | 544/315 |
| 5,445,930 | 8/1995 | Harada et al. | 430/588 |
| 5,519,145 | 5/1996 | Fabriciis et al. | 548/450 |

FOREIGN PATENT DOCUMENTS

| | | |
|---|---|---|
| 0288076 | 4/1988 | European Pat. Off. . |
| 0362387 | 4/1990 | European Pat. Off. . |
| 420012 | 4/1991 | European Pat. Off. . |
| 0 430 244 A1 | 6/1991 | European Pat. Off. . |
| 0430244 | 6/1991 | European Pat. Off. . |
| 908750 | 11/1944 | France . |
| 6145539 | 5/1994 | Japan . |

OTHER PUBLICATIONS

"Polymethine dyes with hydrocarbon bridges. Effect of substituents in the chromophore on the color of tricarbocyanines." Slominskii, Yu L.; Radchenko, I.D.; Tolmachev, A.I.; (Inst. Org. Khim., Kiev, USSR), 1979. 15(2), 400–7.

L. Strekowski et al., Synthetic Comm., 22(17), 2593–2598 (1992).

L. Strekowski et al., J. Amer. Chem. Soc., 4578–4580 (1992).

M. Lipowska et al., Synthetic Comm. 23(21), 3087–3094 (1993).

Yu. L. Slominskii, et al., Chem. Abs. 91:22390 (1979).

R. J. Williams, et al., Anal. Chem., 65, 601–605 (1993).

*Primary Examiner*—Thorl Chea
*Attorney, Agent, or Firm*—Ratner & Prestia

[57] ABSTRACT

Disclosed is a photographic element comprising an antihalation dye of formula:

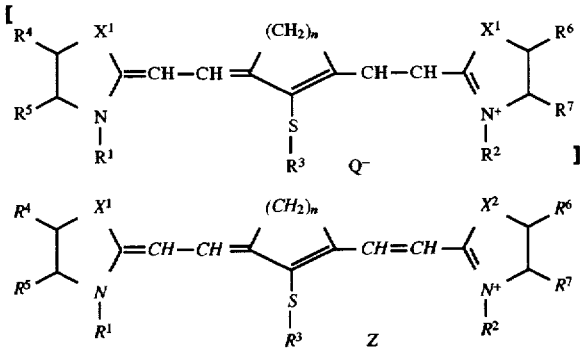

wherein $X^{1+g}$ [,] *and* $X^2$ independently represent[s] —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents [a ring chosen from the set consisting of aryl, substituted aryl, and] a heterocyclic ring;

$R^4$, $R^5$, $R^6$ and $R^7$ independently represent hydrogen, alkyl of 1–10 carbons, substituted alkyl of 1–10 carbons[,]; *or* $R^4$ and $R^5$ taken together or $R^6$ and $R^7$ taken together [may] represent the atoms necessary to form a 5 or 6-membered aliphatic ring, an aromatic six-membered ring, an aromatic 10-membered ring, a substituted aromatic [six-member] *six-membered* ring or a substituted aromatic [10-member] *10-membered* ring;

$R^{8+g}$ [,] *and* $R^9$ independently represent alkyl of 1–10 carbons, substituted alkyl of 1–10 carbons, aryl of 6–10 carbons, substituted aryl of 6–10 carbons;

$R^{10}$ represents an alkyl of 1–10 carbons, substituted alkyl of 1–10 carbons, aryl of 6–10 carbons, substituted aryl of 6–10 carbons; *and*

*Z represents* $CF_3SO_3^-$, $Et_3NH^+$, $Na^+$, *or* $K^+$.

29 Claims, No Drawings

PHOTOGRAPHIC ELEMENT WITH NEAR-INFRARED ANTIHALATION LAYER

Matter enclosed in heavy brackets [ ] appears in the original patent but forms no part of this reissue specification; matter printed in italics indicates the additions made by reissue.

FIELD Of INVENTION

This invention relates to a photographic element which is particularly well suited for use with a near-infrared laser. More specifically, this invention relates to a unique dye which can be used in the photographic element. Even more specifically this invention relates to the use of these unique dyes in an antihalation layer of a photographic element.

BACKGROUND OF THE INVENTION

It is well known in the art of photographic science to add dyes to the structure of a photographic element in such a way as to absorb deleterious light. The dye can be located in several positions including: between the exposure source and the photosensitive emulsion; between the photosensitive emulsion and the support; and on the opposite side of the support to inhibit halation. Specific applications are illustrated, for example, in Research Disclosure, No. 308, December 1989, Item 308119.

Antihalation is particularly important when a film is exposed with a laser such as in the use of long wavelength laser films for medical imaging. The high intensity of long wavelength light (i.e. near-infrared) emitted by the laser is difficult to filter completely. If high levels of a dye are used it is typically difficult to remove the dye during processing and the result is a coloration, or dye stain, which is undesirable.

The development of the gallium-arsenic semiconductor laser, or diode laser, is expected to extend the use of lasers for medical imaging into the wavelength range of 780–830 nm. This application requires a film which is sensitive in this wavelength range and has an antihalation layer which absorbs in this region and is stable with time. Provided herein is a novel class of dyes which absorb throughout the near-infrared region and are well suited for use as an antihalation dye.

SUMMARY Of THE INVENTION

A novel thioheterocyclic near-infrared absorbing dye is provided of formula

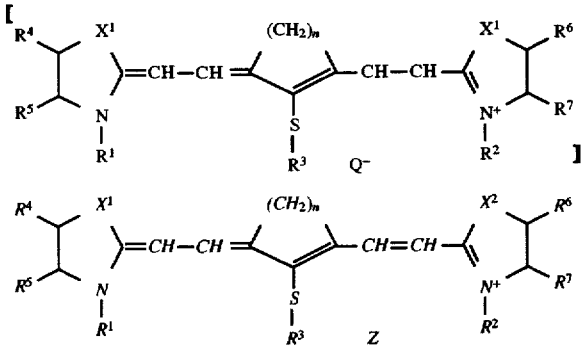

wherein $X^{1+g}$ [,] *and* $X^2$ independently represent[s] —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents [a ring chosen from the set consisting of aryl, substituted aryl, and] a heterocyclic ring;

$R^4$, $R^5$, $R^6$ and $R^7$ independently represent hydrogen, alkyl of 1–10 carbons, substituted alkyl of 1–10 carbons[,]; *or* $R^4$ and $R^5$ taken together or $R^6$ and $R^7$ taken together [may] represent the atoms necessary to form a 5 or 6-membered aliphatic ring, an aromatic six-membered ring, an aromatic 10-membered ring, a substituted aromatic [six-member] *six-membered* ring or a substituted aromatic [10-member] *10-membered* ring;

$R^{8+g}$ [,] *and* $R^9$ independently represent alkyl of 1–10 carbons, substituted alkyl of 1–10 carbons, aryl of 6–10 carbons, substituted aryl of 6–10 carbons;

$R^{10}$ represents an alkyl of 1–10 carbons, substituted alkyl of 1–10 carbons, aryl of 6–10 carbons, substituted aryl of 6–10 carbons; *and*

*Z represents* $CF_3SO_3^-$, $Et_3NH^+$, $Na^+$, *or* $K^+$.

DETAILED DESCRIPTION OF THE INVENTION

Dyes of the current invention are defined by the following formula:

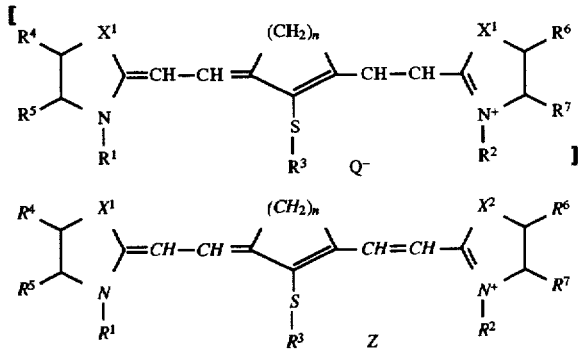

wherein $X^{1+g}$ [,] *and* $X^2$ independently represent[s] —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents [a ring chosen from the set consisting of aryl of 6–10 carbons, substituted aryl of 6–10 carbons, and] a heterocyclic ring;

$R^4$, $R^5$, $R^6$ and $R^7$ independently represent hydrogen, alkyl of 1–10 carbons, substituted alkyl of 1–10 carbons[,]; *or* $R^4$ and $R^5$ taken together or $R^6$ and $R^7$ taken together [may] represent the atoms necessary to form a 5 or 6-membered aliphatic ring, an aromatic six-membered ring, an aromatic 10-membered ring, a substituted aromatic [six-member] *six-membered* ring or a substituted aromatic [10-member] *10-membered* ring;

$R^{8+g}$ [,] *and* $R^9$ independently represent alkyl of 1–10 carbons, substituted alkyl of 1–10 carbons, aryl of 6–10 carbons, substituted aryl of 6–10 carbons;

$R^{10}$ represents an alkyl of 1–10 carbons, substituted alkyl of 1–10 carbons, aryl of 6–10 carbons, substituted aryl of 6–10 carbons; *and*

*Z represents* $CF_3SO_3^-$, $Et_3NH^+$, $Na^+$, *or* $K^+$.

While not limited thereto a preferred compound is obtained when $X^1$ or $X^2$ is chosen from the set consisting of $CR^8R^9$, S or $NR^{10}$. Most preferred is $X^1$ or $X^2$ being $CR^8R^9$.

A preferred compound is obtained when $R^1$ or $R^2$ represents an alkyl of 1 to 5 carbons and most preferred is $R^1$ or $R^2$ substituted with a sulfonate group or a carboxyl group.

The term "heterocyclic ring" refers specifically to the type present in photographic emulsions. More specifically heterocyclic ring refers to a heterocyclic nuclei comprising 5 to 6 atoms in a heterocyclic ring. Preferably, $R^3$ represents a heterocyclic ring composed of atoms selected from the group consisting of C, N, O, S and Se. Specifically preferred examples of heterocyclic rings of the types present in photographic emulsions are chosen from the [set] *group* consisting of:

the thiazole series; e.g. thiazole, 4-methylthiazole, 4-phenylthiazole, 5-methylthiazole, 5-phenylthiazole, 4,5-dimethylthiazole, [4,5l-diphenylthiazole] *4,5-diphenylthiazole*, 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole;

the naphthothiazole series; e.g., naphtho[1,2]-thiazole, naphtho[2,1]thiazole, 5-methoxynaphtho[2,1]-thiazole, 5-ethoxynaphtho[2,1]thiazole, 8-methoxynaphtho[1,2]thiazole, 7-methoxynaphtho[1,2]thiazole;

the thianaphtheno-7',6',4,5-thiazole series; e.g. 4'-methoxythianaphtheno-7',6',4,5,thiazole;

the oxazole series; e.g., 4-methyloxazole, 5-methyloxazole, 4-phenyloxazole, 4,5-diphenyloxazole, 4-ethyloxazole, 4,5-dimethyloxazole, 5-phenyloxazole;

the benzoxazole series; e.g., benzoxazole, 5-chlorobenzoxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole;

the naphthoxazole series, e.g., naphtho[1,2]oxazole, naphtho[2,1]oxazole;

the selenazole series; e.g., 4-methylselenazole, 4-phenylselenazole;

the benzoselenazole series; e.g., benzoselenazole, 5-chlorobenzoselenazole, 5-methylbenzoselenazole, 5-methoxybenzoselenazole, 5-hydroxybenzoselenazole, tetrahydrobenzoselenazole;

the naphthoselenazole series; e.g., naphthol[1,2]selenazole, naphtho[2,1]selenazole;

the thiazoline series; e.g., thiazoline, 4-methylthiazoline;

the 2-quinoline series; e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline;

the 4-quinoline series; e.g., quinoline, 6-methoxyquinoline, 7-methoxyquinoline, 7-methylquinoline, 8-methylquinoline;

the 1-isoquinoline series; e.g., isoquinoline, 3,4-dihydroisoquinoline;

the 3-isoquinoline series; e.g., isoquinoline;

the benzimidazole series; e.g., 1,3-diethylbenzimidazole, 1-ethyl-3-phenylbenzimidazole;

the 3,3-dialkylindolenine series; e.g., 3,3-dimethylindoline, 3,3,5-trimethylindolenine, 3,3,7-trimethylindolenine;

the 2-pyridine series; e.g., pyridine, 5-methylpyridine; and the 4-pyridine series; e.g., pyridine;

the 3,3-dialkylbenz[e]indole series; e.g., 3,3-dimethylbenz[e]indole;

the tetrazole series: e.g., 1-phenyltetrazole, 1-methyltetrazole;

the triazole series: e.g., 1-phenyl-triazole, 1-methyltriazole;

the pyrimidine series: e.g., pyrimidine; *and* the thiadiazole series: e.g., 1,3,4-thiadiazole.

Preferred compounds are obtained when $R^3$ is chosen from the [set] *group* consisting of:

the thiazole series; e.g. thiazole, 4-methylthiazole, 4-phenylthiazole, 5-methylthiazole, 5-phenylthiazole, 4,5-dimethylthiazole, [4,5l-diphenylthiazole] *4,5-diphenylthiazole*, 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole;

the benzoxazole series; e.g., benzoxazole, 5-chlorobenoxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole;

the benzimidazole series; e.g., 1,3-diethylbenzimidazole, 1-ethyl-3-phenylbenzimidazole;

the tetrazole series: e.g., 1-phenyltetrazole, 1-methyltetrazole;

the triazole series: e.g., 1-phenyl-triazole, 1-methyltriazole;

the pyrimidine series: e.g., pyrimidine; *and* the thiadiazole series: e.g., 1,3,4-thiadiazole.

The term "alkyl" is used herein in a manner consistent with the art to describe a straight chain or branched hydrocarbon group. The term "aryl" is used herein in a manner consistent with the art to describe an aromatic cyclic six-membered ring such as a phenyl group or an aromatic 10-membered ring such as a naphthalene group. The term "substituted alkyl", as used herein, specifically refers to a straight or branched alkyl which is substituted with at least one group such as sulfonate, carboxyl, hydroxy, halogen, —OL, where L is an alkyl or substituted alkyl of 1–10 carbons, carbonylalkyl, amine or aryl. The most preferred substituent for alkyl is sulfonate or carboxyl. The term "substituted aryl", as used herein, specifically refers to a six- or 10-membered ring which is substituted with at least one group such as sulfonate, carboxyl, hydroxy, halogen, —OL, where L is an alkyl or substituted alkyl of 1–10 carbons, carbonylalkyl, amine, or aryl. The most preferred substituent for aryl is sulfonate or carboxylate. The term aromatic six-membered ring refers to the atoms chosen from C, N, O and S necessary to form an aromatic ring. Specifically preferred examples include phenyl, pyridine, pyrimidine, pyrazine, and pyridazine. The term aromatic 10-membered ring refers to the atoms chosen from C, N, O and S necessary to from an aromatic 10-membered ring. Specific examples include quinoline, naphthalene, phthalazine, naphthyridine, quinoxaline, quinazoline, cinnoline, pteridine. The term 5 or 6-membered aliphatic ring refers to the elements C, N, O and S necessary to form an aliphatic ring. Specific examples include cyclopentane, cyclopentene, cyclohexane, cyclohexene, furan, pyran, pyrrole, pyrroline, pyrrolidine, piperidine, piperizine.

Exemplary dyes are provided in Table 1. Within Table 1, Y is defined by the following structures:

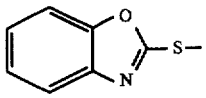

MBO

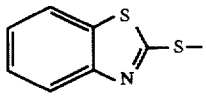

MBT

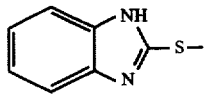

MBI

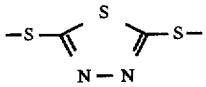

BMTD

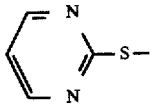

PYR

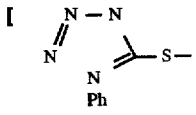

PMT ]

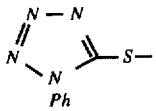

*PMT*

-continued

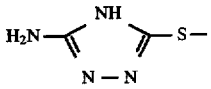

AMT

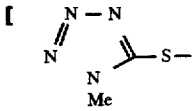

MMTE ]

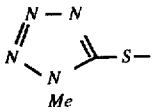

*MMTE*

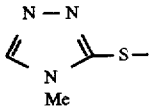

MTT

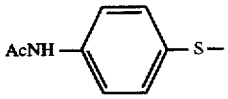

SAR

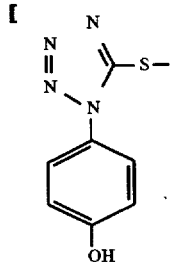

HPMT ]

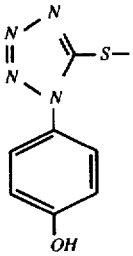

*HPMT*

When BMTD is used the dye is in the form of a dimer with BMTD acting as a bridging group between two chromophores.

Dyes of the current invention are prepared by known organic preparative techniques in accordance with the following synthetic reaction:

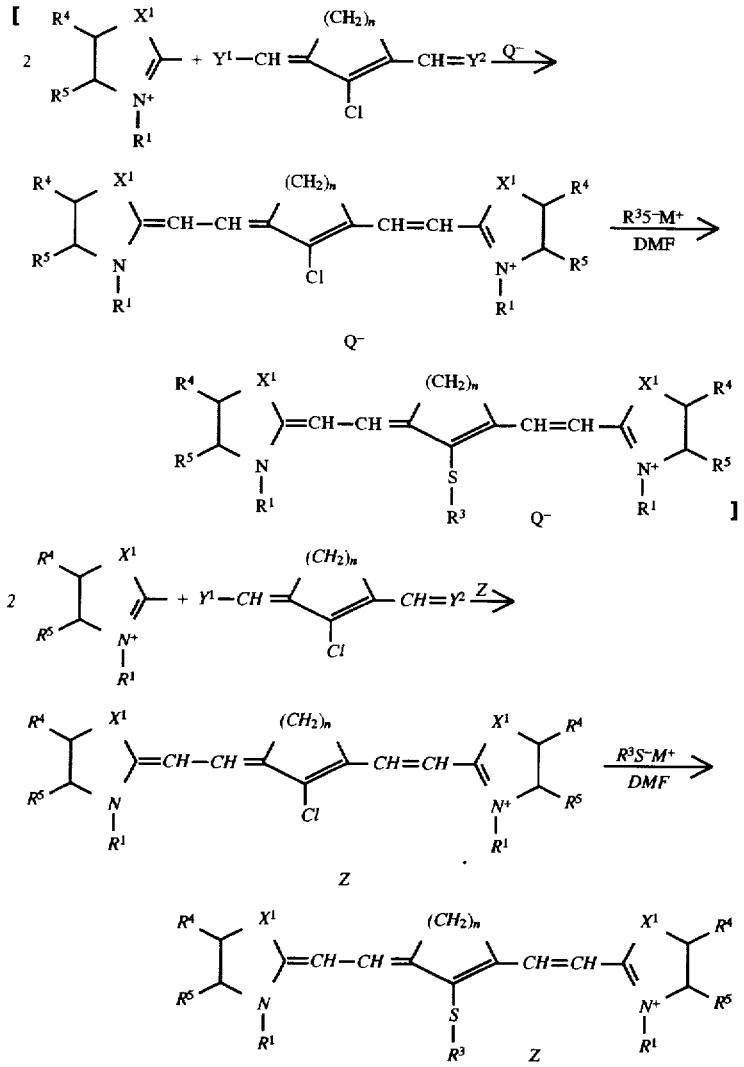

wherein $R^1$, $R^3$, $R^4$, $R^5$, $X^1$, n, and [Q] Z are as defined above. One of ordinary skill in the art would appreciate that the unsymmetrical dye could be prepared in an analogous manner by substituting one mole of the cyclic amine with a second cyclic amine as known in the art.

The choice of cyclic amine represented by:

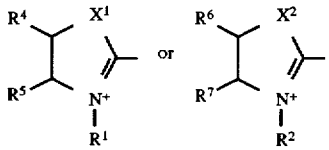

will determine the terminal rings of the final dye. As such when $X^1$ or $X^2$ is intended to be $CR^8R^9$ the proper starting material is an appropriately substituted pyrrole or indole; when $X^1$ or $X^2$ is intended to be —S— the proper starting material is an appropriately substituted thiazole, benzothiazole or naphthothiazole; when $X^1$ or $X^2$ is intended to be —Se— the proper starting material is an appropriately substituted selenazole, benzoselenazole or naphthselenazole; when $X^1$ or $X^2$ is intended to be —NR— the proper starting material is an appropriately substituted imidazole, benzimidazole, or naphthimidazole; when $X^1$ or $X^2$ is intended to be —CH=CH— the proper starting material is an appropriately substituted pyridine, quinoline or benzquinoline; and when $X^1$ or $X^2$ is intended to be —O— the proper starting material is an appropriately substituted oxazole, benzoxazole or naphthoxazole.

The following detailed synthetic procedures are not intended to be limiting in any way. Other compounds described herein can be prepared in an analogous manner using standard organic synthetic procedures as known in the art.

The antihalation layer comprises an absorbing amount of the antihalation dye represented by Formula 1 and can be present (1) on the opposite side of the support from a photosensitive layer; (2) between the photosensitive layer and the support; (3) supra to a photosensitive layer or (4) between photosensitive layers. Other conventional layers, such as, for example, subbing layers, antistatic layers, overcoats, etc., may be present. These conventional layers may be present either between the photosensitive layer and/or the antihalation layer and the support, between the photosensitive layer and the antihalation layer in the case in which both layers are present on the same side of the support, or on the side of the photosensitive layer and/or the antihalation layer away from the support.

The antihalation layer also comprises a vehicle. Such vehicles are well-known in the art and include [hyrophilic] *hydrophilic* colloids, such as, for example a gelatin, which may be derived from a variety of sources, such as, for example, cattle bone, pigskin, etc.; gelatin derivatives, such as, for example, phathalated gelatin, acetylated gelatin, etc.; polysaccharides, such as, for example, dextran, etc.; synthetic polymers, such as, for example, poly(vinyl alcohol) and water soluble partially hydrolyzed poly(vinyl acetate); acrylic polymers; polymers of alkyl and sulfoalkyl acrylates and methacraylates; polyamines; poly(vinyl acetals), such as, for example, poly(vinyl acetal), etc.; poly(vinyl ethers); etc. Gelatin is preferred.

To prepare the antihalation layer the dye can be dissolved in methanol, ethanol, water, or another suitable solvent, and added to an aqueous dispersion or melt of the vehicle. "An absorbing amount of the antihalation dye" means an amount of dye at least sufficient to impart antihalation properties to the layer yet not sufficient to cause any deleterious side effects. For antihalation layers an optical density of about 0.40 at the wavelength used for imaging is preferred. Using techniques well known to those skilled in the art, the concentration of dye required to attain this optical density can be calculated from the thickness of the antihalation layer and the absorption spectrum of the antihalation dye, which can be determined by conventional spectrophotometric techniques. The dyes are typically present in the antihalation layer in an amount of 0.005 to 0.05 g/m$^2$, preferably 0.01 to 0.03 g/m$^2$.

The photosensitive layer, or layers, of the photosensitive element comprises a component which is responsive to radiation. The photosensitive component is, preferably, a conventional gelatino silver halide emulsion or a hydrophilic colloid silver halide emulsion. Conventional photographic silver halide emulsions employing any of the commonly known halides, such as silver chloride, silver bromide, silver iodide, and mixtures thereof, may be used. These may be of varied content and may be negative and/or positive working.

The radiation sensitive layer also comprises a vehicle. Such vehicles are well-known in the art and include the materials useful as vehicles for the antihalation layer, described above. A preferred vehicle is gelatin.

The layer may be hardened by addition of a conventional hardening agent, such as, for example, formaldehyde, glyoxal. Conventional additives may also be present for specific purposes, such as, for example, to enhance and stabilize the response of the emulsion.

The preparation of silver halide emulsions is well known in the art. Silver halide emulsions, their preparation, and the preparation of photosensitive layers therefrom, are described in: Research Disclosure, Item 17643, December 1978; Research Disclosure, Item 18431, August 1979; Research Disclosure, Item 22534, January, 1983; and Abbot, U.S. Pat. No. 4,425,425, the disclosures of which are incorporated by reference.

The photosensitive component may be sensitized to near-infrared by techniques known in the art. Sensitization of silver halide may be accomplished with chemical sensitizers, such as, for example, gold compounds, iridium compounds, or with other group VIII metal compounds, or with spectral sensitizing dyes, such as for example, cyanine dyes, merocyanine dyes, styryls, etc.

The element may comprise any of a number of the other conventional additives and layers, such as are disclosed in any of the above incorporated references. These include, for example, optical brightners, antifoggants, emulsion stabilizers, image stabilizers, filter dyes, intergrain absorbers, light-scattering materials, gelatin hardeners, coating aids, surfactants, overcoat layers, interlayer and barrier layers, antistat layers, plasticizers and lubricants, matting agents, development inhibitor-releasing compounds, etc. The element can be prepared by coating the layers onto the support using coating techniques which are conventional in the art.

The film support may be any suitable transparent plastic. For example, the cellulosic supports, e.g. cellulose acetate, cellulose triacetate, cellulose mixed esters, etc. may be used. Polymerized vinyl compounds, e.g., copolymerized vinyl acetate and vinyl chloride, polystyrene, and polymerized acrylates may also be mentioned. When polyethylene terephthalate is manufactured for use as a photographic support, it is preferable to use a mixed polymer subbing composition such as that taught by Rawlins, U.S. Pat. No. 3,567,452, Miller, U.S. Pat. Nos. 4,916,011 and 4,701,403, Cho, U.S. Pat. Nos. 4,891,308 and 4,585,730 and Schadt, U.S. Pat. No. 4,225,665. Upon completion of stretching and application of subbing composition, it is necessary to remove strain and tension in the base by a heat treatment comparable to the annealing of glass.

STARTING MATERIALS

The following starting materials are used in the synthesis of the dyes.

Compound A

3H-Indolium, 2-[2-[2-chloro-3-[(1,3-dihydro-1,3,3-trimethyl-2H-indol-2-ylidene)ethylidene]-1-cyclopenten-1-yl]ethenyl]-1,3,3-trimethyl-, salt with trifluoromethanesulfonic acid (1:1) is disclosed in Laganis and West, U.S. Pat. No. 4,882,265.

Compound B 1-(4-Sulfobutyl)-2,3,3-trimethylindolenium, inner salt 2,3,3-Trimethylindolenine (16.0 g, 0.01 mol) was heated with 10.4 ml melted 1,4-butanesultone and 20 ml o-xylene at 146° C. for 4 hours. The orange solution was cooled to 60° C. before adding acetone to dilute and induce crystallization. After cooling to room temperature, the product was collected by filtration, washed with acetone, and dried to yield 22.15 g of quaternary salt, mp 236° C.

Compound C

2-Chloro-3-(anilinomethylene)-1-(aniliniummethyl) cyclopent-1-ene hydrochloride is disclosed by reference to Laganis and West, U.S. Pat. No. 4,882,265 and by reference to E.P. 0 420 012 A1.

Compound D

Compound B (4.58 g, 0.0155 mol), Compound C (2.69 g, 0.00775 mol), and 60 ml dimethylformamide were mixed together. Acetic anhydride (4.14 ml) was added, followed by 2.4 g (0.024 mol) triethylamine. The mixture was stirred at room temperature for 5.5 hrs. and then cooled to 0° C. before filtering. The filtrate was poured into 300 ml of stirred ethyl acetate and then chilled. After stirring overnight, the mixture was filtered and the recovered solid reslurried twice with ethyl acetate. After filtering and drying, the yield was 4.25 g, mp 210° C., $\lambda_{max}$(methanol)=806 ($\epsilon$=265,000).

Compound E

2-Chloro-3-(hydroxymethylene)-1-formylcyclohex-1-ene Dimethylformamide (40 ml) and 40 ml dichloromethane were mixed and cooled to 5° C. Phosphorous oxychloride (33 ml) was dissolved in 40 ml dichloromethane and added dropwise to the dimethylformamide/dichloro-methane solution at a rate sufficient to maintain the temperature below 25° C. Cyclohexanone (9 g) was added and the mixture heated to reflux for 5 hours. After cooling to room temperature, the reaction mixture was poured into 200 ml of ice and allowed to sit overnight. The quenched mixture was filtered to collect 9.62 g yellow crystals, mp 128° C., $\lambda_{max}$(methanol)=328 nm ($\epsilon$=15,000).

Compound F

Compound E (2.16 g, 0.0125 mol), Compound B (7.38 g, 0.025 mol), and 30 ml acetic acid were mixed together. Acetic anhydride (7 ml) was added, followed by 2.05 g (0.025 mol) anhydrous sodium acetate. The mixture was heated to reflux for 30 min., then cooled to room temperature and filtered. The filtrate was poured into 300 ml ethyl acetate and allowed to sit 3 hours. The solvent was decanted and replaced by fresh ethyl acetate. The mixture was agitated to break up the solid, filtered, and the residue reslurried twice with ethyl acetate. After filtering and drying, the yield was 6.55 g, mp 222° C.(dec), $\mu_{max}$(methanol)=782 nm ($\epsilon$=227,000).

Compound G 2,3,3-Trimethyl-(4-sulfobutyl)-1H-benzindolium, inner salt 1,1,2-Trimethyl-1H-benzindole (184.47 g, 0.88 mol) was heated with 91.8 ml liquid 1,4-butanesultone and 600 ml o-xylene at 144°–148° C. for 7.5 hours. The greenish solution was cooled to 70° C. before adding 200 ml acetone to dilute and induce crystallization. After cooling to 13° C., the product was collected by filtration, washed with acetone, and slurried twice in acetone. After filtering and drying, the yield was 193.10 g of quaternary salt, mp 222° C.

Compound H

Compound G (171 g, 0.05 mol), Compound C (86 g, 0.25 mol), and 2000 ml dimethylformamide were mixed together. Acetic anhydride (100 ml) was added. To the stirred mixture was added 75.5 g (0.75 mol) triethylamine. The mixture was carefully heated and held between 83°–90° C. for no more than 6 minutes. The reaction cooled quickly with a methanol-ice bath to −3° C. The mixture was filtered to removed unreacted starting material and the filtrate was then poured into 5000 ml of ethyl acetate. The mixture was chilled and stirred for at least three hours, then filtered, and the isolated product reslurried in ethyl acetate. After filtration and drying, the yield was 173.10 g, mp 241° C., $\lambda_{max}$(methanol)=845 nm ($\epsilon$=250,000). A second crop of dye was recovered after letting the initial ethyl acetate quench sit overnight: 4.75 g, mp 249° C., $\lambda_{max}$(methanol)=845 nm ($\epsilon$=289,000).

Compound I

Compound E (1.72 g, 0.01 mol), 6-Sulfo-1-(4-sulfobutyl)-2,3,3-trimethyl-1H-benzindolium, inner salt (NKX-1632 from Nippon Kankoh Shikiso, 8.27 g, 0.02 mol), and 30 ml acetic acid were mixed together. Acetic anhydride (7 ml) was added, followed by 4.1 g (0.05 mol) anhydrous sodium acetate. The mixture was heated to reflux for 21 min., then cooled to room temperature and filtered. The filtrate was poured into 300 ml ethyl acetate and allowed to sit overnight[]. The solvent was decanted and replaced by fresh ethyl acetate. The mixture was agitated to break up the solid, filtered and dried. The yield was 9.20 g, mp >350° C., $\lambda_{max}$(methanol)=821 nm ($\epsilon$=226,000).

Compound J

Compound E (2.16 g, 0.0125 mol), 5-Sulfo-1-(4-Sulfobutyl)-2,3,3-trimethylindolenium, inner salt (NKX-1653 from Nippon Kankoh Shikiso, 9.38 g, 0.025 mol), and 30 ml acetic acid were mixed together. Acetic anhydride (7 ml) was added, followed by 4.1 g (0.05 mol) anhydrous sodium acetate. The mixture was heated to reflux for 20 min., then cooled to room temperature and filtered. The filtrate was poured into 300 ml ethyl acetate to copiously precipitate solid. After stirring three hours, the mixture was filtered and the product reslurried in 150 ml ethyl acetate overnight. After filtering and drying, the yield was 13.55 g., mp 298° C. (dec), $\lambda_{max}$ (methanol)=789 nm ($\epsilon$=197,000).

Compound K

Compound C (4.3 g, 0.0125 mol), 5-Sulfo-1-(4-Sulfobutyl)-2,3,3-trimethylindolenium, inner salt (NKX-1653 from Nippon Kankoh Shikiso, 9.38 g, 0.025 mol), and 60 ml dimethylformamide were mixed together. Acetic anhydride (6.6 ml) was added, followed by 5.6 g (0.055 mol) triethylamine. The mixture was stirred at room temperature for 4.5 hours. The reaction mixture was filtered and the filtrate was poured into 200 ml ethyl acetate. After stirring at least one hour, the mixture was filtered and the product reslurried in ethyl acetate. After filtering and drying, the yield was 11.91 g., mp 154°–187° C., $\lambda_{max}$ (methanol)=811 nm ($\epsilon$=251,000).

Compound L

3-Ethyl-2-methylbenzothiazolium iodide (11003 from H. W. Sands, 2.44 g, 0.008 mol), Compound C (1.38 g, 0.04 mol), and 30 ml dimethylformamide were mixed together. Acetic anhydride (2.0 ml) was added, followed by 1.2 g (0.012 mol) triethylamine. The mixture was stirred at room temperature for 3 hrs. and then filtered. The collected gold-brown crystals were slurried overnight with ethyl acetate. After filtering and drying, the yield was 1.80 g, mp 222° C., $\lambda_{max}$(methanol)=807 ($\epsilon$=196,000).

Compound M 1,3-Diallyl-2-methyl-4,5-quinoxalino-imidazolium 4-toluenesulfonate 2,3-Bis-(3-allylamino)quinoxalinium 4-toluenesulfonate (16.48 g), prepared by reaction of allylamine with 2,3-dichloroquinoxaline, was refluxed with 40 ml acetic anhydride for two hours. After cooling to room temperature, the reaction mixture was poured into 300 ml of stirred diethyl ether. The resulting precipitate was broken up and triturated with ether until fine particles were obtained. Yield was 12.63 g, mp 158° C.

Compound N

Compound M (17.46 g, 0.04 mol), Compound C (6.88 g, 0.02 mol), and 200 ml dimethylformamide were mixed together. Acetic anhydride (10.4 ml) was added, followed by 6.0 g (0.06 mol) triethylamine. The mixture was stirred at room temperature for 4.5 hrs. and then filtered. The filtrate was poured into 2000 ml of water, stirred for an hour, and filtered. The product was reslurried in ethyl acetate, filtered and dried to yield 14.31 g, mp 165°–173° C., $\lambda_{max}$ (1% acetic acid/methanol)=846 nm ($\epsilon$=165,000).

SYNTHESIS OF DYE COMPOUNDS

Dye D-1

2,5-Dimercapto-1,3,4-thiadiazole, dipotassium salt (0.45 g, 0.002 mol) was mixed with 20 ml DMF. To this mixture was added 2.48 g (0.004 mol) of Compound A. After 1 hour, the reaction mixture was filtered and then poured into 200 ml of stirred water. After 60 minutes of stirring, the mixture was filtered and the collected dye dried to give 2.28 g dye, mp 208° C., $\lambda_{max}$(methanol)=741 nm ($\epsilon$=241,000), 813 ($\epsilon$=207,000).

Dye D-2

2-Mercaptopyrimidine (0.3 g, 0.0027 mol) was mixed with 10 ml DMF. Triethylamine (0.27 g, 0.0027 mol) was added. To this mixture was added 1.0 g (0.00134 mol) of Compound F. The reaction was instantaneous. The reaction mixture was filtered and then poured into 200 ml of stirred ethyl acetate. After 60 minutes of stirring, the mixture was filtered. The product was collected, washed again with ethyl acetate, filtered and dried to give 1.08 g. dye, mp 120°–195° C. (dec), $\lambda_{max}$(methanol)=798 nm ($\epsilon$=170,000).

Dye D-3

2-Benzoxazolethiol (0.6 g, 0.004 mol) was mixed with 10 ml DMF. Triethylamine (0.4 g, 0.004 mol) was added. To this mixture was added 1.5 g (0.002 mol) of Compound F. The reaction mixture was stirred 6.5 hrs at room temperature, then filtered and poured into 200 ml of stirred ethyl acetate. After 60 minutes of stirring, the mixture was filtered. The product was collected, washed again with ethyl acetate, filtered and dried to give 1.43 g dye, mp 195°–203° C. (dec), $\lambda_{max}$(methanol)=802 nm ($\epsilon$=207,000).

Dye D-4

4-Acetamidothiophenol (0.67 g, 0.004 mol) was mixed with 10 ml DMF. Sodium hydroxide (0.32 g, 0.008 mol) in 1 ml water was added. To this mixture was added 1.91 g (0.002 mol) of Compound J. The reaction was stirred for forty minutes at room temperature. The reaction mixture was filtered and then poured into 200 ml of stirred ethyl acetate. After stirring one hour, the mixture was filtered and reslurried with ethyl acetate. After filtering and drying, the yield was 2.54 g ,mp 245°–258° C., $\lambda_{max}$(methanol)=801 nm ($\epsilon$=128,000). A purer sample was obtained by slurrying 1 g of the product in ethyl acetate, adding 1 ml concentrated hydrochloric acid to coagulate, decanting the solvent and redissolving the residue in methanol. The methanol solution was poured into 100 ml stirred ethyl acetate. After stirring 3 hours, the precipitate was collected by filtration, washed with ethyl acetate, and dried to yield 0.87 g. mp 272° C.(dec), $\lambda_{max}$(methanol)=802 nm ($\epsilon$=149,000).

Dye D-5

2-Mercaptopyrimidine (0.45 g, 0.004 mol) was mixed with 10 ml DMF. Sodium hydroxide (0.16 g, 0.004 mol) in 0.5 g water was added. To this mixture was added 1.91 g (0.002 mol) of Compound J. The reaction was stirred 2 hrs at room temperature. The reaction mixture was filtered and then poured into 200 ml of stirred ethyl acetate. After stirring two hours, the mixture was filtered and reslurried with ethyl acetate. After filtering and drying, the yield was 2.12 g., 310° C. (dec), $\lambda_{max}$(methanol)=803 nm ($\epsilon$=133,000).

Dye D-6

1-phenyl-1H-tetrazole-5-thiol, sodium salt (0.8 g, 0.004 mol) was mixed with 10 ml DMF. To this mixture was added 1.5 g (0.002 mol) of Compound F. The reaction mixture was stirred 4 hrs at room temperature, then filtered and then poured into 200 ml of stirred ethyl acetate. After 60 minutes of stirring, the mixture was filtered. The product was collected, washed again with ethyl acetate, filtered and dried to give 1.64 g dye, mp 180° C. (dec), $\lambda_{max}$(methanol)=806 nm ($\epsilon$=169,000).

Dye D-7

4-Methyl-4H,1,2,4-triazole-3-thiol (0.46 g, 0.004 mol) was mixed with 20 ml DMF. Sodium hydroxide (0.16 g, 0.004 mol) in 1 ml water was added. To this mixture was added 1.91 g (0.002 mol) of Compound J. The reaction was stirred one hour at room temperature. The reaction mixture was filtered and then poured into 200 ml of stirred ethyl acetate. After stirring one hour, the mixture was filtered and reslurried with ethyl acetate. After filtering and drying, the yield was 1.75 g, 310° C. (dec), $\lambda_{max}$(methanol)=809 nm ($\epsilon$=84,000).

Dye D-8

2-Benzoxazolethiol (0.61 g, 0.004 mol) was mixed with 10 ml DMF. Sodium hydroxide (0.16 g, 0.004 mol) in 0.5 ml water was added. To this mixture was added 1.91 g. (0.002 mol) of Compound J. The reaction was stirred 3.5 hrs at room temperature. The reaction mixture was filtered and then poured into 200 ml of stirred ethyl acetate. After stirring two hours, the mixture was filtered and reslurried with ethyl acetate. After filtering and drying, the yield was 1.71 g, 325° C. (dec), $\lambda_{max}$(methanol)=809 nm ($\epsilon$=148,000).

Dye D-9

3-Amino-5-mercapto-1,2,4-triazole(0.93 g, 0.008 mol) was mixed with 20 ml DMF. To this mixture was added 2.48 g (0.004 mol) of Compound A. After 3.5 hours, the reaction mixture was filtered and then poured into 200 ml of stirred water. After 60 minutes of stirring, the mixture was filtered. The dye was collected and dried to give 2.36 g dye, mp 216° C., $\lambda_{max}$(methanol)=811 nm ($\epsilon$=132,000).

Dye D-10

4-Acetamidothiophenol (2.68 g, 0.016 mol) was mixed with 40 ml DMF. A solution of 0.64 g (0.016 mol) sodium hydroxide in 2 ml water was added. To this mixture was added 4.96 g (0.008 mol) of Compound A. After 1 hour, the reaction mixture was filtered and then poured into 200 ml of stirred water. After 60 minutes of stirring, the mixture was filtered. The product was collected and dried to give 6.69 g crude dye, mp 70°–105° C., $\lambda_{max}$(methanol)=811 nm ($\epsilon$=172,000).

Dye D-11

1-Phenyl-1H-tetrazole-5-thiol, sodium salt (0.80 g, 0.004 mol) was mixed with 10 ml DMF. To this mixture was added 1.91 g (0.002 mol) of Compound J. The reaction was stirred 27 hrs at room temperature. The reaction mixture was filtered and then poured into 200 ml of stirred ethyl acetate. After stirring three hours, the mixture was filtered and reslurried with ethyl acetate. After filtering and drying, the yield was 0.80 g , 300° C. (dec), $\lambda_{max}$(methanol)=813 nm ($\epsilon$=196,000).

Dye D-12

2,5-Dimercapto-1,3,4-thiadiazole, dipotassium salt (1.8 g, 0.008 mol) was mixed with 20 ml DMF. To this mixture was added 2.48 g (0.004 mol) of Compound A. After 1 hour, the reaction mixture was filtered and then poured into 200 ml of stirred water. After 60 minutes of stirring, the mixture was filtered and the collected dye dried to give 1.44 g dye, mp 215° C., $\lambda_{max}$(methanol)=819 nm ($\epsilon$=257,000).

Dye D-13

2-Mercaptopyrimidine (0.9 g, 0.008 mol) was mixed with 20 ml DMF. A solution of 0.32 g (0.008 mol) sodium hydroxide in 0.32 ml water was added. To this mixture was added 2.48 g (0.004 mol) of Compound A. The absorption of the solution instantaneously shifted from 797 nm to 819 nm. The reaction mixture was filtered and then poured into 200 ml of stirred water. After 60 minutes of stirring, the mixture was filtered and the collected dye dried to give 2.49 g dye, mp 245° C., $\lambda_{max}$(methanol)=819 nm ($\epsilon$=229,000).

Dye D-14

2-Mercaptobenzimidazole (1.2 g, 0.008 mol) was mixed with 20 ml DMF. A solution of 0.32 g (0.008 mol) sodium hydroxide in 0.32 ml water was added. To this mixture was added 2.48 g (0.004 mol) of Compound A. The absorption of the solution instantaneously shifted from 797 nm to 814 nm. The reaction mixture was filtered and then poured into 200 ml of stirred water. After 60 minutes of stirring, the mixture was filtered and the collected dye reslurried with isopropanol. After filtering and drying, the yield was 1.48 g dye, mp 211°–215° C., $\lambda_{max}$(methanol)=819 nm ($\epsilon$=38,000).

Dye D-15

4-Methyl-4H-1,2,4-triazole-3-thiol (0.92 g, 0.008 mol) was mixed with 20 ml DMF. Triethylamine (0.81 g, 0.008 mol) was added. To this mixture was added 2.48 g (0.004 mol) of Compound A. After 50 minutes, the reaction mixture was filtered and then poured into 200 ml of stirred water. After 60 minutes of stirring, the mixture was filtered. The product was collected and dried to give 2.52 g dye, mp 149°–165° C., $\lambda_{max}$(methanol)=822 nm ($\epsilon$=226,000).

Dye D-16

2-Mercaptopyrimidine (0.34 g, 0.003 mol) was mixed with 10 ml DMF. To this mixture was added 0.30 g (0.003 mol) triethylamine. After mixing well, Compound D (0.91 g, 0.001 mol) was added. The reaction was instantaneous. The reaction mixture was filtered and then poured into 200 ml of stirred ethyl acetate. After 120 minutes of stirring, the mixture was filtered. The product was collected, washed again with ethyl acetate, filtered and dried to give 0.76 g dye, mp 134°–145° C., $\lambda_{max}$(methanol)=823 nm ($\epsilon$=220,000).

Dye D-17

4-Acetamidothiophenol (0.67 g, 0.004 mol) was mixed with 10 ml DMF. Triethylamine (0.404 g, 0.004 mol) was added. To this mixture was added 2.35 g (0.002 mol) of Compound K. The reaction was stirred for forty minutes at room temperature. The solvent was decanted and the residue dissolved in methanol. The solution was treated with 10 ml of 20% potassium acetate in methanol. The product immediately precipitated. After filtering and drying, the yield was 1.30 g, mp 310° C., $\lambda_{max}$ (methanol)=823 nm ($\epsilon$=164,000).

Dye D-18

2-Benzoxazolethiol (30.2 g, 0.02 mol) was mixed with 500 ml dimethylformamide (DMF). A solution of 8.0 g (0.2 mol) sodium hydroxide in 16 ml water was added. To this mixture was added 62 g (0.1 mol) of Compound A. The absorption of the solution instantaneously shifted from 797 nm to 823 nm. The reaction mixture was filtered and then poured into 1000 ml of stirred water. After 60 minutes of stirring, the mixture was filtered and the product vacuum-dried. The dry dye was stirred 60 minutes with 200 ml methanol, filtered, and air-dried to give 49.31 g. dye, mp 139°–141° C., $\lambda_{max}$(methanol)=825 nm ($\epsilon$=211,000).

Dye D-19

2-Mercaptobenzothiazole (1.34 g, 0.008 mol) was mixed with 20 ml DMF. A solution of 0.32 g (0.008 mol) sodium hydroxide in 0.32 ml water was added. To this mixture was added 2.48 g (0.004 mol) of Compound A. After 1 hour, the reaction mixture was filtered and then poured into 200 ml of stirred water. After 60 minutes of stirring, the mixture was filtered. The dye was collected and dried to give 3.12 g, mp 70°–85° C., $\lambda_{max}$(methanol)=825 nm ($\epsilon$=183,000).

Dye D-20

5-Mercapto-1-methyltetrazole sodium salt hydrate (1.11 g, 0.008 mol) was mixed with 20 ml DMF. To this mixture was added 2.48 g (0.004 mol) of Compound A. After 2.5 hours, the reaction mixture was filtered and then poured into 200 ml of stirred water. After 60 minutes of stirring, the mixture was filtered. The product was collected and dried to give 2.67 g dye. The crude dye was rewashed with 5% aqueous sodium carbonate, filtered, and dried to give 2.44 g, mp 125°–144° C., $\lambda_{max}$(methanol)=828 nm ($\epsilon$=196,000).

Dye D-21

Compound A (1.24 g, 0.002 mol) was mixed with 1-phenyl-1H-tetrazole-5-thiol, sodium salt (0.752 g, 0.004 mol) in 10 ml dimethylformamide (DMF). The absorption of the solution instantaneously shifted from 797 nm to 830 nm. The reaction mixture was filtered, then poured into 200 ml ether. The solvent was decanted and the residual oil rinsed with both ether and water. The oil was treated with a small amount of methanol to solidify, then filtered and washed with isopropanol to collect 1.10 g golden crystals, mp 133°–140° C., $\lambda_{max}$(methanol)=829 nm ($\epsilon$=197,000).

Dye-D-22

Compound A (2.48 g, 0.004 mol) was mixed with 1-(4-hydroxyphenyl-1H-tetrazole-5-thiol (ORWO OB-1209, 1.55 g, 0.008 mol) in 20 ml dimethylformamide (DMF) and 0.32 g sodium hydroxide in 1 ml water. The absorption of the solution instantaneously shifted from 797 nm to 829 nm. The reaction mixture was stirred for 20 min., filtered, and then poured into 200 ml 5% aqueous potassium carbonate. The mixture was stirred for two hours and filtered. The collected product was taken up in acetone, stirred, and filtered to yield 0.77 g, mp 197° C., $\lambda_{max}$=829 nm ($\epsilon$=211,000). The acetone rinsings were poured into 500 ml of 1% aqueous potassium carbonate, stirred 3 hours, filtered, and the product dried to give 1.58 g additional dye, mp 173°–177° C., $\lambda_{max}$=828 nm ($\epsilon$=203,000).

Dye D-23

1-Phenyl-1H-tetrazole-5-thiol, sodium salt (1.6 g, 0.008 mol) was mixed with 10 ml DMF. To this mixture was added 1.47 g (0.002 mol) of Compound D. The reaction was instantaneous. The reaction mixture was filtered and then poured into 200 ml of stirred ethyl acetate. After 60 minutes of stirring, the mixture was filtered. The product was collected, washed again with ethyl acetate, filtered and dried to give 0.50 g dye, mp 185° C. (dec), $\lambda_{max}$(methanol)=838 nm ($\epsilon$=164,000).

Dye D-24

2-Mercaptopyrimidine (0.45 g, 0.004 mol) was mixed with 10 ml DMF. Sodium hydroxide (0.16 g, 0.004 mol) in 0.5 g water was added. To this mixture was added 2.1 g (0.002 mol) of Compound I. The reaction was stirred 5.5 hrs at room temperature. The reaction mixture was filtered and then poured into 200 ml of stirred ethyl acetate. After stirring overnight, the mixture was filtered and reslurried twice with ethyl acetate. After filtering and drying, the yield was 2.18 g., mp >350° C. (dec), $\lambda_{max}$(methanol)=834 nm ($\epsilon$=199,000).

Dye *D*-25

2,5-Dimercapto-1,3,4-thiadiazole, dipotassium salt (0.23 g, 0.001 mol) was mixed with 20 ml DMF. To this mixture was added 2.10 g (0.002 mol) of Compound I. The reaction was stirred 5.5 hrs at room temperature, then 0.33 g sodium hydroxide in 1 ml water was added. The mixture was stirred 16 hrs. at room temperature, then filtered. The filtrate was poured into 200 ml of stirred ethyl acetate. After stirring two hours, the mixture was filtered and reslurried with ethyl acetate. After filtering and drying, the yield was 2.15 g., 301° C. (dec), $\lambda_{max}$(methanol)=836 nm ($\epsilon$=234,000), 765 nm (134,000).

[dye] *Dye* D-26

1-phenyl-1H-tetrazole-5-thiol, sodium salt (0.8 g, 0.004 mol) was mixed with 10 ml DMF. To this mixture was added 0.91 g (0.001 mol) of Compound H. The reaction was instantaneous. The reaction mixture was filtered and then poured into 100 ml of stirred ethyl acetate. After 60 minutes of stirring, the mixture was filtered. The product was collected, washed again with ethyl acetate, filtered and dried to give 0.55 g dye, mp 285° C., $\lambda_{max}$(methanol)=879 nm ($\epsilon$=252,000).

Dye D-27

1-Phenyl-1H-tetrazole-5-thiol, sodium salt (0.4 g, 0.002 mol) was mixed with 10 ml DMF. To this mixture was added 0.6 g (0.00099 mol) Compound L. After stirring six hours at room temperature, the reaction mixture was filtered. The collected product was slurried with ethyl acetate, filtered and dried to give 0.48 g dye, mp 233°–234° C., $\lambda_{max}$(methanol) =844 nm ($\epsilon$=209,000).

[dye] *Dye* D-28

1-Phenyl-1H-tetrazole-5-thiol, sodium salt (0.42 g, 0.002 mol) was mixed with 10 ml DMF. To this mixture was added 0.78 g (0.001 mol) Compound N. After stirring 1.6 hours at room temperature, the reaction mixture was filtered. The filtrated was poured into 200 ml 5% aqueous potassium carbonate, stirred for three hours, then filtered and dried to give 0.69 g dye, mp 138°–143° C. (dec), $\lambda_{max}$(1% acetic acid/methanol)=874 nm ($\epsilon$=121,000).

TABLE 1

EXEMPLARY DYES

INDOLENINE

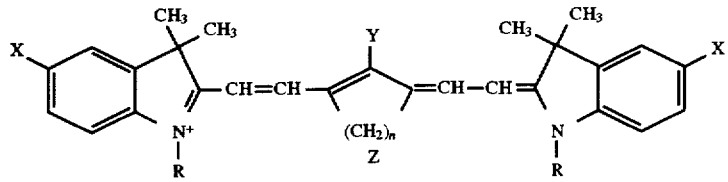

| DYE | X | R | Y | Z | n | $\lambda_{max}$nm ($\epsilon\times10^{-5}$) |
|---|---|---|---|---|---|---|
| D-1 | H | $CH_3$ | BMTD (2:1)* | $CF_3SO_3$ | 2 | 741 (2.41) 813 (2.07) |
| D-2 | H | $(CH_2)_4SO_3^-$ | PYR | $(Et_3NH^+)$ | 3 | 798 (1.69) |
| D-3 | H | $(CH_2)_4SO_3^-$ | MBO | $(Et_3NH^+$ | 3 | 802 (2.07) |
| D-4 | $SO_3^-$ | $(CH_2)_4SO_3^-$ | SAR | $3Na^+$ | 3 | 802 (1.49) |
| D-5 | $SO_3^-$ | $(CH_2)_4SO_3^-$ | PYR | $3Na^+$ | 3 | 803 (1.33) |
| D-6 | H | $(CH_2)_4SO_3^-$ | PMT | $Na^+$ | 3 | 806 (1.69) |
| D-7 | $SO_3^-$ | $(CH_2)_4SO_3^-$ | MTT | $3Na^+$ | 3 | 809 (0.83) |
| D-8 | $SO_3^-$ | $(CH_2)_4SO_3^-$ | MBO | $3Na^+$ | 3 | 809 (1.48) |
| D-9 | H | $CH_3$ | AMT | $CF_3SO_3^-$ | 2 | 811 (1.31) |
| D-10 | H | $CH_3$ | SAR | $CF_3SO_3^-$ | 2 | 811 (1.71) |
| D-11 | $SO_3^-$ | $(CH_2)_4SO_3^-$ | PMT | $3Na^+$ | 3 | 813 (1.96) |
| D-12 | H | $CH_3$ | BMTD (1:1)** | $CF_3SO_3^-$ (1:1)** | 2 | 819 (2.57) |
| D-13 | H | $CH_3$ | PYR | $CF_3SO_3^-$ | 2 | 819 (2.29) |
| D-14 | H | $CH_3$ | MBI | $CF_3SO_3^-$ | 2 | 819 (0.38) |
| D-15 | H | $CH_3$ | MTT | $CF_3SO_3^-$ | 2 | 823 (2.18) |
| D-16 | H | $(CH_2)_4SO_3^-$ | PYR | $(Et_3NH^{+})$ | 2 | 823 (2.19) |
| D-17 | $SO_3^-$ | $(CH_2)_4SO_3^-$ | SAR | $3K^+$ | 2 | 823 (1.64) |
| D-18 | H | $CH_3$ | MBO | $CF_3SO_3^-$ | 2 | 825 (2.11) |
| D-19 | H | $CH_3$ | MBT | $CF_3SO_3^-$ | 2 | 825 (1.83) |
| D-20 | H | $CH_3$ | MMTE | $CF_3SO_3^-$ | 2 | 828 (1.96) |
| D-21 | H | $CH_3$ | PMT | $CF_3SO_3^-$ | 2 | 829 (1.97) |
| D-22 | H | $CH_3$ | HPMT | $CF_3SO_3^-$ | 2 | 829 (2.11) |

TABLE 1-continued

| | | | | | | |
|---|---|---|---|---|---|---|
| D-23 | H | $(CH_2)_4SO_3^-$ | PMT | $Na^+$ | 2 | 838 (1.64) |

BENZINDOLES

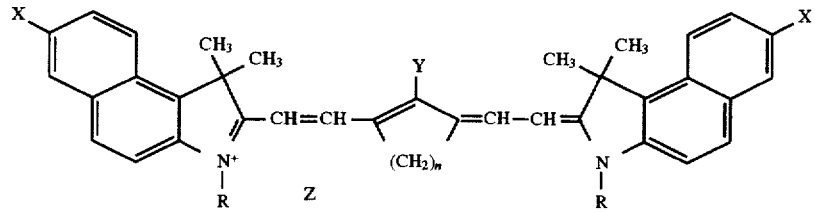

| DYE | X | R | Y | Z | n | $\lambda_{max}$nm ($\epsilon \times 10^{-5}$) |
|---|---|---|---|---|---|---|
| D-24 | $SO_3^-$ | $(CH_2)_4SO_3^-$ | PYR | $3Na^+$ | 3 | 834 (2.00) |
| D-25 | $SO_3^-$ | $(CH_2)_4SO_3^-$ | BMTD (2:1)* | $3Na^+$ | 3 | 836 (2.34) 736 (1.33) |
| D-26 | H | $(CH_2)_4SO_3^-$ | PMT | $Na^+$ | 2 | 879 (2.52) |

BENZOTHIAZOLE

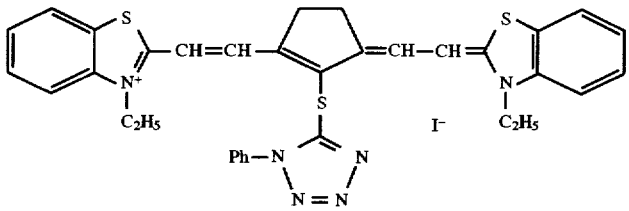

D-27 $\lambda_{max}$ = 844 nm ($\epsilon$ = 209,000)

QUINOXALINE

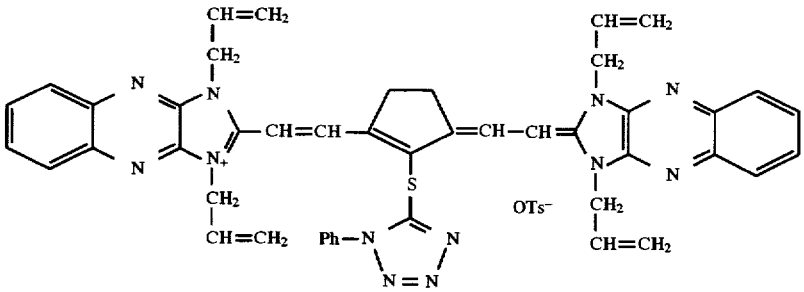

D-28 $\lambda_{max}$ = 874 nm ($\epsilon$ = 121,000)

*Two thioether links
**One thioether link

EXAMPLE 1

Preparation of Antihalation Backing Solution

A 7% gelatin solution is made by cold soaking and then dissolving dry gelatin in water. This solution contains the ingredients as tabulated below:

| | |
|---|---|
| deionized water | 1900 g |
| dry gelatin | 200 g |
| 5% polymethacrylate beads in a 4% aqueous gelatin solution | 50 g |
| 3N sulfuric acid | 10 g |
| 16.5% aqueous Triton ® X-200 (28%) (trademark of Union Carbide Corp.) | 100 g |
| Lensodel ® HB7 (trademark of Shell Corp.) | 2 g |
| 10.2% aqueous Fluorad ® FC-129 (trademark of 3M Corp.) | 8 g |
| 10% aqueous Oxonol Red 536 Pina ® (trademark of Riedel de Haën A.G.) | 25 g |
| 3.7% Aqueous formaldehyde | 50 g |
| Aqueous or alcoholic dye solution | up to 250 g |

The above-prepared coating solution containing 7% gelatin in water in then applied to a 0.007 inch polyethylene terephthalate substrate suitably subbed as described in Alles U.S. Pat. No. 2,779,684. Formaldehyde hardener is added into the gelatin solution. The coated layer is passed through a film dryer where cold air first sets the gelatin and then warm dry air removes the moisture and alcohol. The resulting antihalation layer contains 4.0 g gelatin/sq. meter. In the following tables the symbols F, D, J, K, I and L refer to the Compounds in the section STARTING MATERIAL.

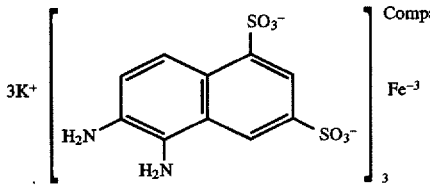

Comparative Compound L

Optical densities found for these dyes in this antihalation layer is shown in Table 2.

TABLE 2

Optical densities of antihalation layer at NIR laser wavelengths.

| Dye | $\lambda_{max}$ film | amt ($mg/m^2$) | Optical Densities @$\lambda_{max}$ | 780 nm | 820 nm | 830 nm |
|---|---|---|---|---|---|---|
| F | 797 | 32.7 | 0.643 | 0.544 | 0.425 | 0.38 |
| D-2 | 811 | 33.2 | 0.561 | 0.345 | 0.53 | 0.425 |
| D-3 | 816 | 33.8 | 0.571 | 0.33 | 0.565 | 0.505 |
| D-6 | 825 | 34 | 0.500 | 0.29 | 0.50 | 0.466 |
| D | 823 | 23.9 | 0.535 | 0.245 | 0.532 | 0.516 |
| D-16 | 848 | 24.5 | 0.44 | 0.205 | 0.298 | 0.357 |
| J | 806 | 33.8 | 0.573 | 0.37 | 0.427 | 0.267 |
| D-5 | 819 | 34 | 0.400 | 0.185 | 0.397 | 0.385 |
| D-7 | 824 | 50 | 0.518 | 0.265 | 0.511 | 0.504 |
| D-8 | 826 | 35 | 0.40 | 0.20 | 0.4 | 0.4 |
| D-11 | 827 | 26.2 | 0.339 | 0.157 | 0.326 | 0.337 |
| K | 827 | 34 | 0.51 | 0.233 | 0.495 | 0.505 |
| C-1 | 824 | 24 | 0.476 | 0.257 | 0.474 | 0.456 |
| I | 838 | 34 | 0.515 | 0.255 | 0.423 | 0.49 |
| D-24 | 853 | 33.9 | 0.383 | 0.175 | 0.255 | 0.295 |
| D-25 | 856 | 34 | 0.195 | 0.157 | 0.141 | 0.157 |
| D-26 | 885 | 16.7 | 0.235 | 0.12 | 0.128 | 0.131 |
| C-2 | 839 | 34 | 0.284 | 0.123 | 0.237 | 0.268 |
| L | 705 | 93.8 | 0.198 | 0.139 | 0.0725 | 0.054 |

The example clearly shows the dyes of this invention have superior and more efficient light-absorbing properties than the well-known comparative Compound L. All dyes of this invention provide higher optical density at dye levels significantly lower than comparative Compound L. This provides economic benefit since desired antihalation optical densities can be obtained at much lower dye levels compared to comparative Compound L. The dyes of this invention provide absorption which is more suitable and optimally balanced for use with lasers emitting at 820 and 830 nm.

EXAMPLE 2

The antihalation layer was prepared as in example 1. The films were tested for post-processing stain by processing the film at 90 sec. at 34° C. in DuPont MD developer and MF fixer. Residual dye stain is reported as per cent of fresh optical density. Fading of the films are reported as per cent of optical density after 3 days accelerated aging at 50° C. and 60% relative humidity. The results obtained are presented in Table 3.

TABLE 3

Ageing results of Antihalation Layer

| Dye | $\lambda_{max}$ (film) nm | O.D. fresh | % Stain | % Fading |
|---|---|---|---|---|
| F | 797 | 0.643 | 58 | 95 |
| D-2 | 811 | 0.561 | 24 | 95 |
| D-3 | 816 | 0.571 | 36 | 91 |
| D-6 | 819 | 0.5 | 39 | 97 |
| D | 823 | 0.535 | 46 | 53 |
| D-16 | 848 | 0.44 | 17 | 75 |
| J | 804 | 0.57 | 9 | 89 |
| D-5 | 819 | 0.408 | 12 | 96 |
| D-7 | 824 | 0.518 | 11 | 104 |
| D-11 | 827 | 0.339 | 18 | 105 |
| D-8 | 824 | 0.4 | 15 | 100 |
| K | 827 | 0.51 | 15 | 46 |
| C-1 | 824 | 0.476 | 72 | 86 |
| I | 838 | 0.515 | 50 | 108 |
| D-24 | 853 | 0.383 | 32 | 104 |
| D-25 | 854 | 0.195 | 46 | 101 |
| D-26 | 898 | 0.12 | 45 | 60 |
| C-2 | 839 | 0.234 | 63 | 102 |

The example clearly shows that the dyes of this invention provide improvement in dye stain and/or fading characteristics compared to Compounds F and D.

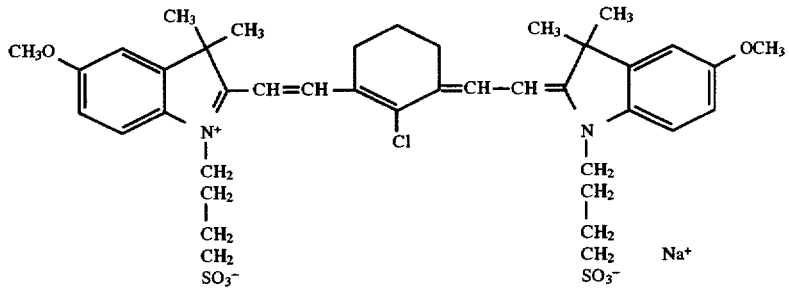

Comparative C-1

-continued

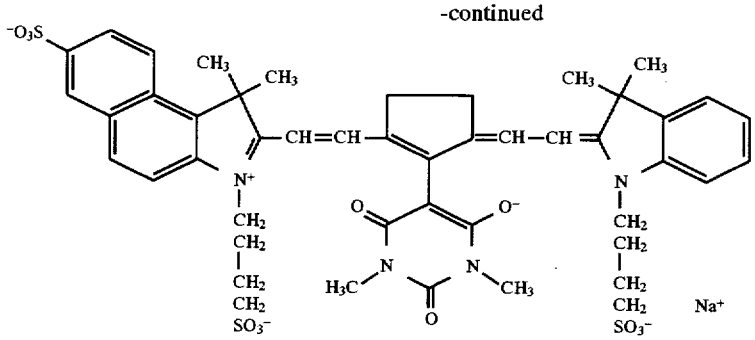

Comparative C-2

[1] *We* claim:

1. A photographic element comprising *a photosensitive silver halide emulsion layer and* an absorbing amount of the antihalation dye:

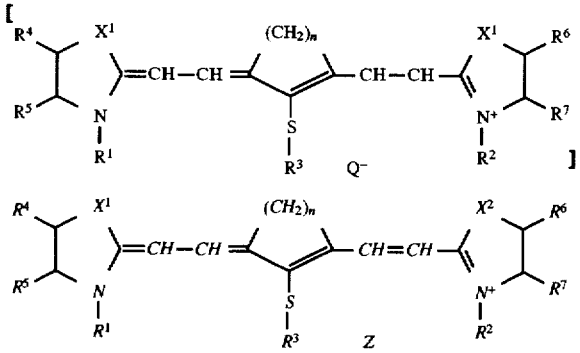

wherein $X^{1+g}$ [,] *and* $X^2$ independently represent[s] —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents [a ring chosen from the set consisting of aryl, substituted aryl, and] a heterocyclic ring, *said heterocyclic ring being a substituted or unsubstituted 5- or 6-membered heterocyclic ring containing hetero atoms selected from the group consisting of nitrogen, oxygen, sulfur, and selenium*;

$R^4$, $R^5$, $R^6$ and $R^7$ independently represent hydrogen, alkyl of 1–10 carbons, *or* substituted alkyl of 1–10 carbons[,]; *or* $R^4$ and $R^5$ taken together or $R^6$ and $R^7$ taken together [may] represent the atoms necessary to form a 5 or 6-membered aliphatic ring, an aromatic six-membered ring, an aromatic 10-membered ring, a substituted aromatic [six-member] *six-membered* ring or a substituted aromatic [10-member] *10-membered* ring;

$R^{8+g}$ [,] *and* $R^9$ independently represent alkyl of 1–10 carbons, substituted alkyl of 1–10 carbons, aryl of 6–10 carbons, *or* substituted aryl of 6–10 carbons;

$R^{10}$ represents an alkyl of 1–10 carbons, substituted alkyl of 1–10 carbons, aryl of 6–10 carbons, *or* substituted aryl of 6–10 carbons; *and*

*Z represents* $CF_3SO_3^-$, $Et_3NH^+$, $Na^+$, *or* $K^+$.

2. The photographic element recited in claim 1 wherein [$R^3$ is] $X^1$ *or* $X^2$ *represent* $CR^8R^9$; $R^8$ and $R^9$ independently represent alkyl of 1–10 carbons, substituted alkyl of 1–10 carbons, aryl of 6–10 carbons, substituted aryl of 6–10 carbons.

3. The photographic element recited in claim 1 wherein at least one of $R^1$ and $R^2$ is an alkyl of 1 to 10 carbon atoms substituted with sulfonate or [carbonate] *carboxylate*.

4. The photographic element recited in claim 1 wherein $R^4$ and $R^5$ or $R^6$ and $R^7$ are taken together to form a six-membered aromatic ring or a 10-membered aromatic ring.

5. The photographic element recited in claim 4 wherein said six-membered aromatic ring or said 10-membered aromatic ring is substituted with sulfonate or carboxylate.

6. The photographic element recited in claim 1 wherein $R^1$ or $R^2$ is an alkyl of 1–10 carbon atoms substituted with a sulfonate or carboxylate and at least one combination of $R^4$ and $R^5$ or $R^6$ and $R^7$ are taken together to form a six-membered aromatic ring or a 10-membered aromatic ring wherein said six-membered aromatic ring or said 10-membered aromatic ring is substituted with a sulfonate or a carboxylate.

7. The photographic element recited in claim 6 wherein said $R^1$ or $R^2$ is alkyl of 1–5 carbon[s] atoms.

8. The photographic element recited in claim 1 wherein said $R^3$ is chosen from the [set] *group* consisting of pyrimidine, benzoxazole, phenyltetrazole, and methyltriazole.

9. A photographic element comprising *a photosensitive silver halide emulsion layer and* a dye of formula:

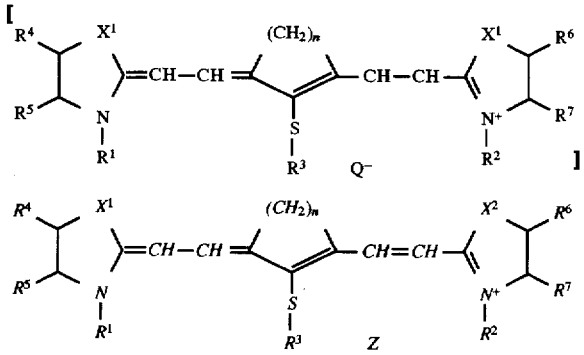

wherein $X^{1+g}$ [,] *and* $X^2$ independently represent[s] —$CR^8R^9$—, —S—, —Se—, —$NR^{10}$—, —CH=C— or —O—;

n is 2;

$R^1$ and $R^2$ independently represent alkyl of 1 to 10 carbons or substituted alkyl of 1 to 10 carbons;

$R^3$ represents [a ring chosen from the set consisting of aryl, substituted aryl, and] a heterocyclic ring, *said heterocyclic ring being a substituted or unsubstituted 5- or 6-membered heterocyclic ring containing hetero atoms selected from the group consisting of nitrogen, oxygen, sulfur, and selenium*;

$R^4$, $R^5$, $R^6$ and $R^7$ independently represent hydrogen, alkyl of 1–10 carbons, *or* substituted alkyl of 1–10 carbons[,]; *or* $R^4$ and $R^5$ taken together or $R^6$ and $R^7$ taken together [may] represent the atoms necessary to form a 5 or 6-membered aliphatic ring, an aromatic six-membered ring, an aromatic 10-membered ring, a substituted aromatic [six-member] *six-membered* ring or a substituted aromatic [10-member] *10-membered* ring;

$R^{8+g}$ [,] *and* $R^9$ independently represent alkyl of 1–10 carbons, substituted alkyl of 1–10 carbons, aryl of 6–10 carbons, *or* substituted aryl of 6–10 carbons;

$R^{10}$ represents an alkyl of 1–10 carbons, substituted alkyl of 1–10 carbons, aryl of 6–10 carbons, *or* substituted aryl of 6–10 carbons; *and*

*Z represents* $CF_3SO_3^-$, $Et_3NH^+$, $Na^+$, *or* $K^+$.

10. A photographic element comprising *a photosensitive silver halide emulsion layer and* a dye of formula:

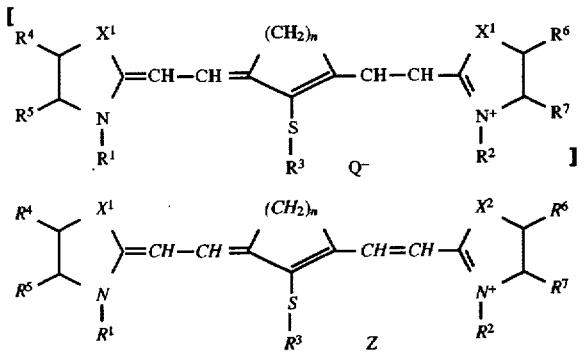

wherein $X^{1+g}$ [,] *and* $X^2$ independently represent[s] —$CR^8R^9$—, —S—, —Se—, —$NR^{10}$—, —CH=CH— or —O—;

n is 3;

$R^1$ and $R^2$ independently represent alkyl of 1 to 10 carbons or substituted alkyl of 1 to 10 carbons;

$R^3$ represents [a ring chosen from the set consisting of aryl, substituted aryl, and] a heterocyclic ring, *said heterocyclic ring being a substituted or unsubstituted 5- or 6-membered heterocyclic ring containing hetero atoms selected from the group consisting of nitrogen, oxygen, sulfur, and selenium*;

$R^4$, $R^5$, $R^6$ and $R^7$ independently represent hydrogen, alkyl of 1–10 carbons, *or* substituted alkyl of 1–10 carbons[,]; *or* $R^4$ and $R^5$ taken together or $R^6$ and $R^7$ taken together [may] represent the atoms necessary to form a 5 or 6-membered aliphatic ring, an aromatic six-membered ring, an aromatic 10-membered ring, a substituted aromatic [six-member] *six-membered* ring or a substituted aromatic [10-member] *10-membered* ring;

$R^{8+g}$ [,] *and* $R^9$ independently represent alkyl of 1–10 carbons, substituted alkyl of 1–10 carbons, aryl of 6–10 carbons, *or* substituted aryl of 6–10 carbons;

$R^{10}$ represents an alkyl of 1–10 carbons, substituted alkyl of 1–10 carbons, aryl of 6–10 carbons, *or* substituted aryl of 6–10 carbons; *and*

*Z represents* $CF_3SO_3^-$, $Et_3NH^+$, $Na^+$, *or* $K^+$.

*11. The photographic element recited in claim 7 wherein said* $X^1$ *and* $X^2$ *are the same.*

*12. The photographic element recited in claim 1 wherein* $X^1$ *and* $X^2$ *are chosen from the group consisting of* —$CR^8R^9$—, *S, and* $NR^{10}$.

*13. The photographic element recited in claim 3 wherein said* $X^1$ *and* $X^2$ *are the same.*

*14. The photographic element recited in claim 13 wherein said heterocyclic ring is selected from the group consisting of thiazole, benzothiazole, benzoxazole, benzimidazole, tetrazole, triazole, pyrimidine, and thiadiazole.*

*15. The photographic element recited in claim 14 wherein* $R^1$ *or* $R^2$ *is an alkyl of 1–5 carbon atoms substituted with sulfonate or carboxylate and at least one combination of* $R^4$ *and* $R^5$ *or* $R^6$ *and* $R^7$ *are taken together to form a six-membered or 10-membered aromatic ring wherein said six-membered or 10-membered aromatic ring is substituted with a sulfonate or a carboxylate.*

*16. The photographic element recited in claim 1 wherein said heterocyclic ring is selected from the group consisting of thiazole, benzothiazole, naphthothiazole, thianaphtheno-7',6',4,5-thiazole, oxazole, benzoxazole, naphthoxazole, selenazole, benzoselenazole, naphthoselenazole, thiazoline, 2-quinoline, 4-quinoline, 1-isoquinoline, 3-isoquinoline, benzimidazole, 3,3-dialkylindolenine, 2-pyridine, 3,3-dialkylbenzindole, tetrazole, triazole, pyrimidine, and thiadiazole.*

*17. The photographic element recited in claim 16 wherein said* $X^1$ *and* $X^2$ *are the same.*

*18. The photographic element recited in claim 17 wherein* $R^1$ *or* $R^2$ *is an alkyl of 1–5 carbon atoms substituted with sulfonate or carboxylate and at least one combination of* $R^4$ *and* $R^5$ *or* $R^6$ *and* $R^7$ *are taken together to form a six-membered or 10-membered aromatic ring wherein said six-membered or 10-membered aromatic ring is substituted with a sulfonate or a carboxylate.*

*19. The photographic element recited in claim 9 wherein* $X^1$ *and* $X^2$ *are chosen from the group consisting of* —$CR^8R^9$—, *S, and* $NR^{10}$.

*20. The photographic element recited in claim 19 wherein said* $X^1$ *and* $X^2$ *are the same.*

*21. The photographic element recited in claim 20 wherein said heterocyclic ring is selected from the group consisting of thiazole, benzothiazole, benzoxazole, benzimidazole, tetrazole, triazole, pyrimidine, and thiadiazole.*

*22. The photographic element recited in claim 9 wherein said heterocyclic ring is selected from the group consisting of thiazole, benzothiazole, naphthothiazole, thianaphtheno-7',6',4,5-thiazole, oxazole, benzoxazole, naphthoxazole, selenazole, benzoselenazole, naphthoselenazole, thiazoline, 2-quinoline, 4-quinoline, 1-isoquinoline, 3-isoquinoline, benzimidazole, 3,3-dialkylindolenine, 2-pyridine, 3,3-dialkylbenzindole, tetrazole, triazole, pyrimidine, and thiadiazole.*

*23. The photographic element recited in claim 22 wherein said* $X^1$ *and* $X^2$ *are the same.*

*24. The photographic element recited in claim 1 wherein said* $X^1$ *and* $X^2$ *are the same.*

*25. The photographic element recited in claim 10 wherein* $X^1$ *and* $X^2$ *are chosen from the group consisting of* —$CR^8R^9$—, *S, and* $NR^{10}$.

*26. The photographic element recited in claim 25 wherein said* $X^1$ *and* $X^2$ *are the same.*

*27. The photographic element recited in claim 26 wherein said heterocyclic ring is selected from the group consisting of thiazole, benzothiazole, benzoxazole, benzimidazole, tetrazole, triazole, pyrimidine, and thiadiazole.*

*28. The photographic element recited in claim 10 wherein said heterocyclic ring is selected from the group consisting of thiazole, benzothiazole, naphthothiazole, thianaphtheno-7',6',4,5-thiazole, oxazole, benzoxazole, naphthoxazole, selenazole, benzoselenazole, naphthoselenazole, thiazoline, 2-quinoline, 4-quinoline, 1-isoquinoline, 3-isoquinoline, benzimidazole, 3,3-dialkylindolenine, 2-pyridine, 3,3-dialkylbenzindole, tetrazole, triazole, pyrimidine, and thiadiazole.*

*29. The photographic element recited in claim 28 wherein said* $X^1$ *and* $X^2$ *are the same.*

* * * * *